(12) United States Patent
Iisaku (10) Patent No.: US 7,428,289 B2
(45) Date of Patent: Sep. 23, 2008

(54) X-RAY CT SYSTEM AND IMAGE PROCESSING METHOD

(75) Inventor: Shinichi Iisaku, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 35 days.

(21) Appl. No.: 10/999,251

(22) Filed: Nov. 30, 2004

(65) Prior Publication Data

US 2005/0117695 A1    Jun. 2, 2005

(30) Foreign Application Priority Data

Dec. 2, 2003    (JP)    ............... 2003-403186

(51) Int. Cl.
*H05G 1/60*    (2006.01)

(52) U.S. Cl. .......................................... 378/4

(58) Field of Classification Search ............... 378/4–21, 378/901, 65
See application file for complete search history.

(56) References Cited

U.S. PATENT DOCUMENTS

| | | | | |
|---|---|---|---|---|
| 4,472,822 A | * | 9/1984 | Swift ........................... | 378/10 |
| 4,680,709 A | * | 7/1987 | Srinivasan et al. ............ | 378/14 |
| 4,737,921 A | * | 4/1988 | Goldwasser et al. ......... | 345/421 |
| 5,295,488 A | | 3/1994 | Lloyd et al. .................. | 600/410 |
| 5,442,672 A | * | 8/1995 | Bjorkholm et al. ............ | 378/4 |
| 5,493,595 A | * | 2/1996 | Schoolman .................... | 378/41 |
| 5,651,043 A | * | 7/1997 | Tsuyuki et al. ................ | 378/65 |
| 5,754,618 A | * | 5/1998 | Okamoto et al. ............... | 378/4 |
| 5,802,134 A | | 9/1998 | Larson et al. .................. | 378/4 |
| 5,823,960 A | | 10/1998 | Young et al. .................. | 600/415 |
| 6,167,110 A | | 12/2000 | Possin et al. .................. | 378/19 |
| 6,196,715 B1 | * | 3/2001 | Nambu et al. ................ | 378/197 |
| 6,215,843 B1 | * | 4/2001 | Saito et al. .................... | 378/19 |
| 6,424,692 B1 | * | 7/2002 | Suzuki .......................... | 378/4 |
| 6,526,117 B1 | * | 2/2003 | Okerlund et al. ............... | 378/8 |

(Continued)

FOREIGN PATENT DOCUMENTS

JP    01-121038    5/1989

(Continued)

OTHER PUBLICATIONS

Japanese Examined Utility Model Publication No. 6-44405; 9 pgs.

(Continued)

*Primary Examiner*—Courtney Thomas
*Assistant Examiner*—Alexander H Taningco
(74) *Attorney, Agent, or Firm*—Armstrong Teasdale LLP (57) ABSTRACT

An X-ray CT system comprises an X-ray source and an X-ray detector opposed to the X-ray source with a subject between them. The X-ray detector detects X-rays irradiated from the X-ray source to the subject. The direction in which the X-ray source irradiates X-rays is shifted about the subject. First tomographic images of a predetermined slice thickness representing sections that are orthogonal to a body axis, which links the subject's head and the subject's tiptoe, at predetermined positions of the subject are produced. The X-ray CT system further comprises a parameter designation block in which parameters that define the conditions for producing second tomographic images, and an image processing unit that produces the second tomographic images from the first tomographic images according to the parameters.

20 Claims, 8 Drawing Sheets

U.S. PATENT DOCUMENTS

| | | | |
|---|---|---|---|
| 6,720,966 B2* | 4/2004 | Barth et al. | 345/424 |
| 7,068,837 B2* | 6/2006 | Befu et al. | 382/154 |
| 2003/0099323 A1* | 5/2003 | Nagata et al. | 378/4 |
| 2003/0123603 A1* | 7/2003 | Suzuki | 378/4 |
| 2004/0042581 A1* | 3/2004 | Okerlund et al. | 378/4 |
| 2004/0120451 A1* | 6/2004 | Tsukagoshi et al. | 378/4 |
| 2005/0094769 A1* | 5/2005 | Heismann et al. | 378/158 |
| 2005/0105678 A1* | 5/2005 | Nakashima | 378/4 |

FOREIGN PATENT DOCUMENTS

| | | |
|---|---|---|
| JP | 7-265300 | 10/1995 |
| JP | 08-227449 | 9/1996 |
| JP | 2003-190145 | 7/2003 |
| JP | 2003-403186 | 12/2003 |

OTHER PUBLICATIONS

Abstract and English Translation of JP08-227449 (10 pgs.).
Abstract and English Translation of JP07-265300 (12 pgs.).
Abstract and English Translation of JP2003-190145 (16 pgs.).
Abstract of JP01-121038 (3 pgs.).

* cited by examiner

| | Distance from Isocenter | | Slice Thickness |
|---|---|---|---|
| | From | To | TH |
| Sagittal Images | L200 | R200 | 10 |
| Coronal Images | A100 | P100 | 10 |

Parameter Designation

X-RAY CT SYSTEM AND IMAGE PROCESSING METHOD

CROSS REFERENCE TO RELATED APPLICATIONS

This application claims the benefit of Japanese Application No. 2003-403186 filed Dec. 2, 2003.

BACKGROUND OF THE INVENTION

The present invention relates to an X-ray CT system and image processing method. More particularly, the present invention is concerned with an X-ray CT system and image processing method for producing second tomographic images, which represent sections different from sections represented by first tomographic images, using the first tomographic images produced from projection data.

Known as a modality for producing tomographic images are X-ray computed tomography (CT) systems that irradiate as radiation, for example, X-rays, detect X-rays having passed through a subject, and produce tomographic images through calculation.

The X-ray CT system includes an X-ray source and an X-ray detector array opposed to the X-ray source with a subject between them. The X-ray detector array detects X-rays irradiated from the X-ray source to the subject. The X-ray CT system scans the subject by rotating the X-ray source about the subject and moving the X-ray source. This results in a plurality of views of projection data of the subject. The X-ray CT system recomposes the acquired projection data so as to produce tomographic images of a predetermined slice thickness representing sections at predetermined positions of the subject.

In general, the X-ray CT system produces tomographic images of sections orthogonal to the direction of a body axis linking the subject's head and the subject's tiptoe. The tomographic images are called axial images.

On the other hand, the produced axial images may be subjected to image processing again in order to produce images of difference sections. More specifically, numerous axial images are superposed on one another in order to reconstruct planar images extending in any direction. Thus, new planar images are produced. The image processing is performed as separate handling. After all axial images are reconstructed, different planar images are produced. Therefore, much time is required until the produced planar images are used for diagnosis. In many cases, after a user diagnoses a lesion using axial images, the image processing is performed if necessary.

For the above reason, there is a demand for an X-ray CT system capable of readily performing the image processing.

Known as such an X-ray CT system includes an X-ray CT system in which as soon as an axial image (body-axis transverse image) of one section is reconstructed, data items lying on a predetermined plane parallel to the body axis are sampled from the image, interpolated, and rearranged (refer to, for example, Patent Document 1). This processing is performed on a plurality of axial images. When radiography for producing axial images is completed, images of sections parallel to the body axis are also produced.

In the above X-ray CT system, an extra scan need not be performed in order to produce new tomographic images. However, X-ray CT systems capable of producing tomographic images are on the trend toward faster scanning and a larger number of detector arrays. There is therefore a possibility that the X-ray CT system described in Patent Document 1 may have to produce a much larger number of images.

[Patent Document 1] Japanese Examined Utility Model Publication No. 6-44405

SUMMARY OF THE INVENTION

Therefore, an object of the present invention is to provide an X-ray CT system and image processing method for producing images to be used for diagnosis for a short period of time and contributing to reduction in the number of images to be used for diagnosis.

For accomplishment of the above object, an X-ray CT system in accordance with the present invention comprises an X-ray source and an X-ray detector array opposed to the X-ray source with a subject between them. The X-ray detector array detects X-rays irradiated from the X-ray source to the subject. The X-ray source is rotated about the subject and moved, whereby first tomographic images of a predetermined slice thickness representing sections that are orthogonal to a body axis, which links the subject's head and the subject's tiptoe, at predetermined positions of the subject are produced. The X-ray CT system further comprises a parameter designating means for designating parameters that define the conditions for producing second tomographic images, which represent predetermined sections parallel to the body axis, from the first tomographic images, and an image processing means for producing the second tomographic images from the plurality of first tomographic images according to the parameters.

According to the X-ray CT system of the present invention, the parameter designating means designates parameters that define the conditions for producing second tomographic images, which represent predetermined sections parallel to the body axis, from the first tomographic images.

The image processing means produces the second tomographic images from the plurality of first tomographic images according to the parameters designated by the parameter designating means.

For accomplishment of the above object, an image processing method in accordance with the present invention is implemented in an X-ray CT system comprising an X-ray source and an X-ray detector array opposed to the X-ray source with a subject between them. The image processing method comprises: a step at which the X-ray detector array detects X-rays irradiated from the X-ray source to the subject and the X-ray source is rotated about the subject and moved in order to scan the subject; and a step of producing first tomographic images of a predetermined slice thickness which represent sections orthogonal to a body axis, which links the subject's head and the subject's tiptoe, at a predetermined position of the subject. The image processing method further comprises: a step of designating parameters that define the conditions for producing second tomographic images, which represent predetermined sections parallel to the body axis, from the first tomographic images; and a step of producing the second tomographic images from the plurality of first tomographic images according to the parameters.

According to the image processing method of the present invention, parameters are designated for defining the conditions for producing second tomographic images, which represent predetermined sections parallel to the body axis, from the first tomographic images.

Thereafter, based on the parameters, the second tomographic images are produced from the plurality of first tomographic images.

According to the X-ray CT system of the present invention, images to be used for diagnosis can be produced for a short period of time and the number of images to be used for diagnosis can be reduced.

According to the image processing method of the present invention, images to be used for diagnosis can be produced for a short period of time and the number of images to be used for diagnosis can be reduced.

Further objects and advantages of the present invention will be apparent from the following description of the preferred embodiments of the invention as illustrated in the accompanying drawings.

DETAILED DESCRIPTION OF THE INVENTION

The best mode for implementing the present invention will be described with reference to drawings below.

Figure 1:
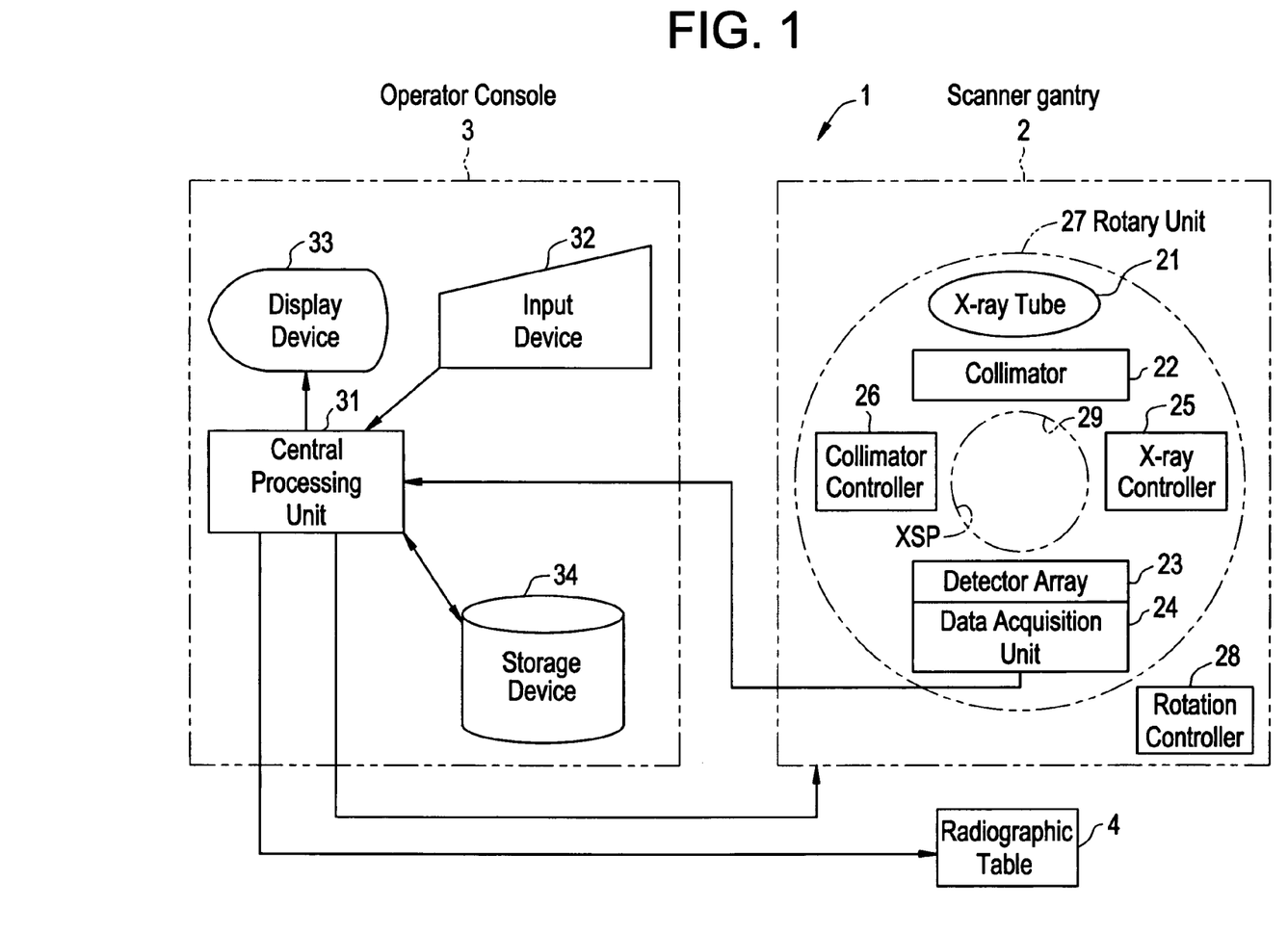
FIG. 1 is a block diagram illustratively showing an X-ray CT system 1 in accordance with an embodiment of the present invention.

FIG. 1 is a block diagram showing the overall configuration of an X-ray CT system in accordance with the present invention.

As shown in FIG. 1, an X-ray CT system 1 comprises a scanner gantry 2, an operator console 3, and a radiographic table (cradle) 4.

The scanner gantry 2 includes an X-ray tube 21, a collimator 22, a detector array 23, a data acquisition unit 24, an X-ray controller 25, and a collimator controller 26.

The X-ray tube 21 radiates X-rays. X-rays radiated from the X-ray tube 21 are recomposed into, for example, a fan-shaped X-ray beam by a collimator 22 and irradiated to the detector array 23. An example of an X-ray source included in the present invention corresponds to the X-ray tube 21.

The detector array 23 has a plurality of X-ray detector elements set in array in a direction in which the fan-beam X-rays spread. The detector array 23 is a multi-channel detector having the plurality of X-ray detector elements set in array. An example of an X-ray detector included in the present invention corresponds to the detector array 23.

The detector array 23 forms an X-ray incidence surface curved like a semi-cylindrical concave surface as a whole. The detector array 23 comprises combinations of, for example, a scintillator and a photodiode. The X-ray detector elements are not limited to the combinations but may be realized with semiconductor X-ray detector elements that utilize cadmium telluride (CdTe) or the like or ionization chamber-type X-ray detector elements that utilize a xenon gas. The detector array 23 is connected to the data acquisition unit 24.

The data acquisition unit 24 acquires detection data items sent from the respective X-ray detector elements constituting the detector array 23.

The X-ray controller 25 controls X-irradiation from the X-ray tube 21.

The collimator controller 26 controls the collimator 22.

The illustrations of the connectional relationship between the X-ray tube 21 and X-ray controller 25 and the connectional relationship between the collimator 22 and collimator controller 26 will be omitted.

The X-ray tube 21, collimator 22, detector array 23, data acquisition unit 24, X-ray controller 25, and collimator controller 26 are incorporated in a rotary unit 27 of the scanner gantry 2. A subject lies down on a cradle in a bore 29 located in the center of the rotary unit 27.

The rotary unit 27 rotates while being controlled by the rotation controller 28. In the rotary unit 27, the X-ray tube 21 irradiates X-rays, and the detector array 23 detects X-rays, which have passed through the subject, as projection information of each view. The illustration of the connection between the rotary unit 27 and rotation controller 28 will be omitted.

The operator console 3 includes a central processing unit 31, an input device 32, a display device 33, and a storage device 34.

The central processing unit 31 comprises, for example, a microprocessor and a memory.

The central processing unit 31 controls the movement of the scanner gantry 2 according to software stored in the storage device 34. The central processing unit 31 has at least a capability to acquire projection data that is acquired with X-rays having passed through the subject and that is detected by the detector array 23, and a capability to produce tomographic images of the subject on the basis of the acquired X-ray projection data.

The central processing unit 31 receives data acquired by the data acquisition unit 24 via a data acquisition buffer that is not shown, and uses the acquired projection data to reconstruct images. Image reconstruction to be performed by the central processing unit 31 will be described later.

The central processing unit 31 is connected to the display device 33 and input device 32 alike.

Tomographic image information and other information sent from the central processing unit 31 are displayed on the display device 33.

A user manipulates the input device 32, whereby various kinds of instructions or pieces of information are transferred to the central processing unit 31.

The user uses the display device 33 and input device 32 to operate the X-ray CT system bi-directionally.

Figure 2:
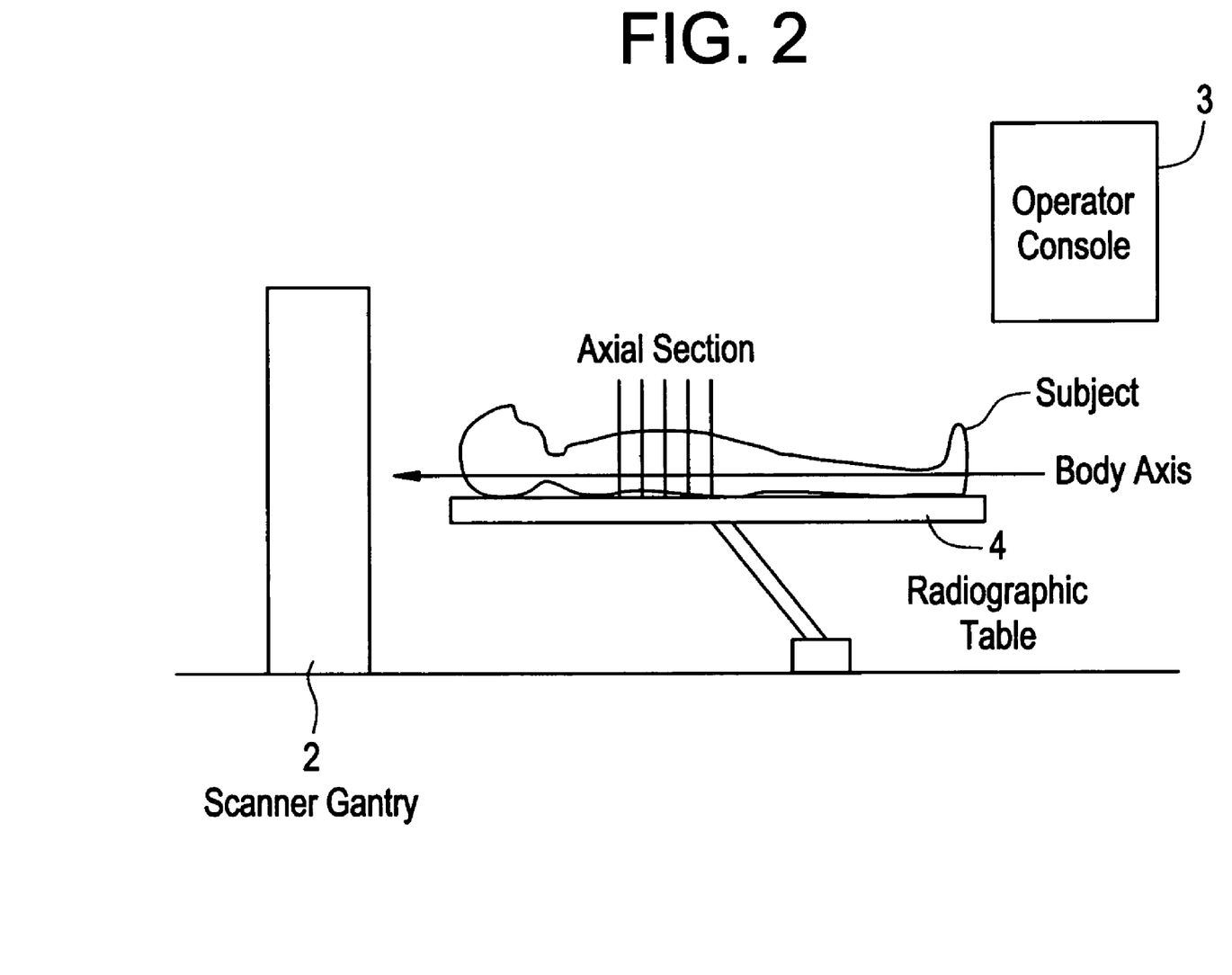
FIG. 2 is a schematic side view illustratively showing the X-ray CT system 1 shown in FIG. 1.

FIG. 2 is a side view of the X-ray CT system 1 in accordance with the present invention.

In the X-ray CT system 1 having the foregoing components, the scanner gantry 2 that moves based on manipulations performed at the operator console 3 causes the X-ray tube 21 and detector array 23 to relatively move. The X-ray tube 21 and detector array 23 move near the subject lying down on the radiographic table 4, and thus scan a region of the subject that is an object of detection.

Consequently, the data acquisition unit 24 acquires projection data from the subject, and transmits the projection data to the central processing unit 31. The central processing unit 31 reconstructs images of axial sections orthogonal to a body axis linking the subject's head and the subject's tiptoe. The images shall be called axial images and correspond to first tomographic images employed in the present invention.

Figure 3:
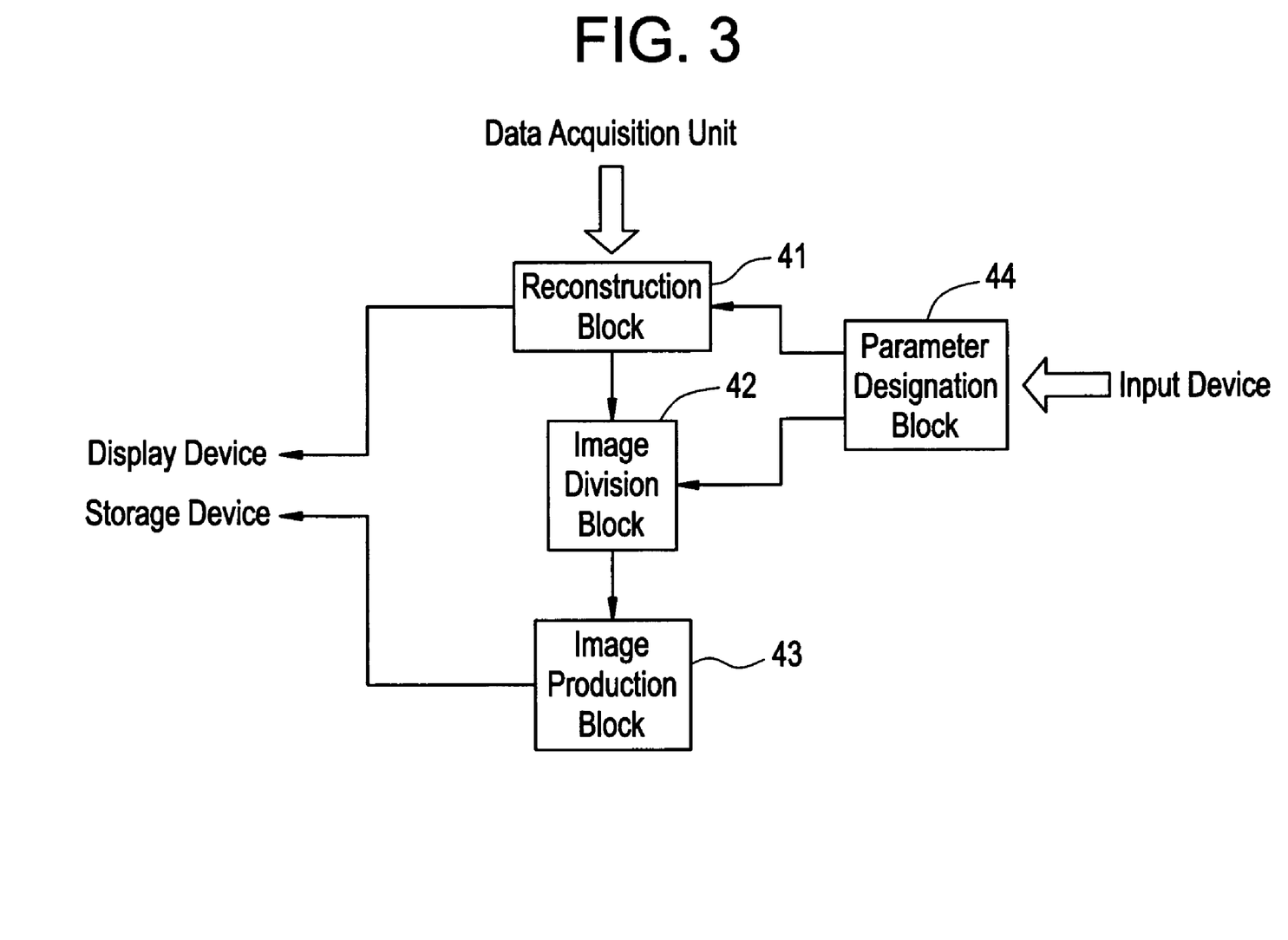
FIG. 3 is a block diagram illustratively showing a central processing unit 31 included in the X-ray CT system 1 shown in FIG. 1.

FIG. 3 is a block diagram illustratively showing the central processing unit 31 included in the X-ray CT system 1.

The central processing unit 31 comprises a reconstruction block 41, an image division block 42, an image production block 43, and a parameter designation block 44.

The reconstruction block 41 recomposes projection data received from the data acquisition unit 24 according to parameters received from the parameter designation block 44, and thus produces axial images. The reconstruction block 41 is realized with a program or the like. The reconstruction block 41 transmits the produced axial images to the image division block 42.

The parameter designation block 44 designates parameters, based on which axial images are produced from projection data, in response to a command entered at the input device 32 by a user. The parameters to be designated include, for example, a slice thickness, a scan field of a subject, a field of view (FOV), a window width (W/W) indicating a range of CT numbers to be selected, and a window level (W/L) indicating a median of the range of CT numbers to be selected. Moreover, an example of a parameter designating means included in the present invention corresponds to the parameter designation block 44.

Moreover, the parameter designation block 44 designates parameters, based on which other tomographic images of sections parallel to the body axis, for example, sagittal images or coronal images are produced, in response to a command entered at the input device 32 by the user.

Now, the sagittal image and coronal image will be described below.

Figure 4:
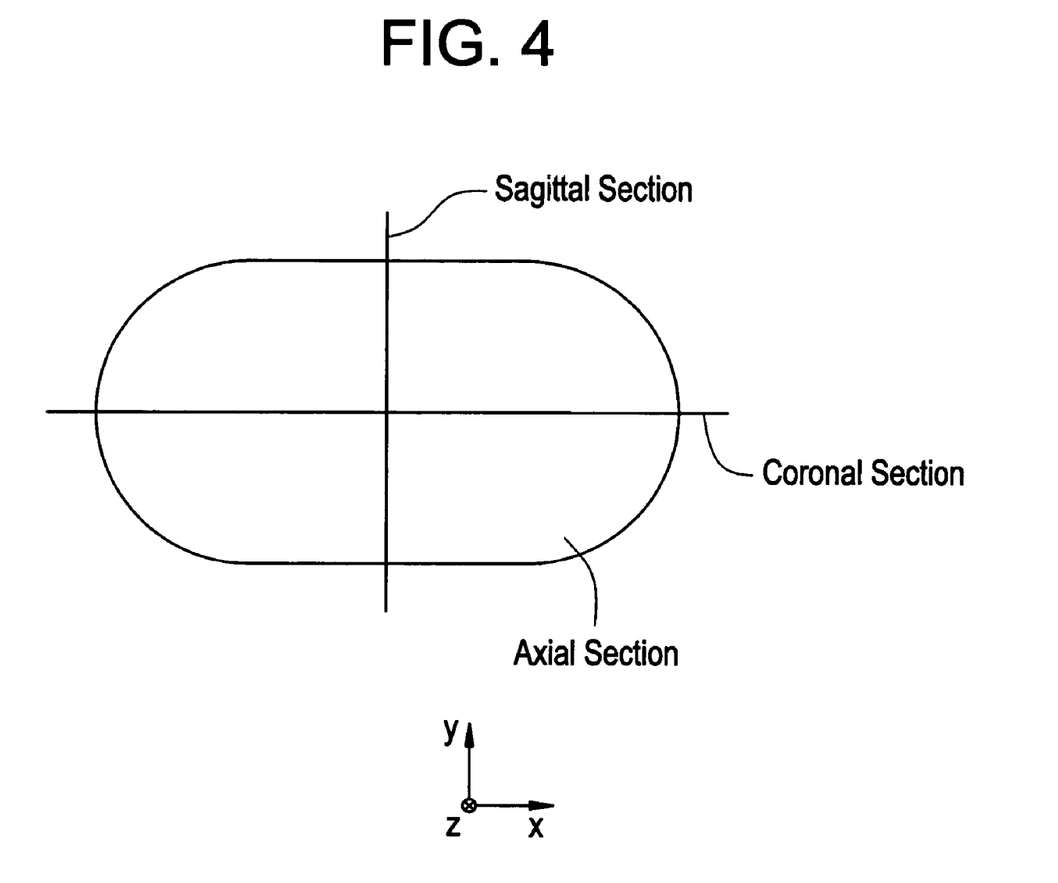
FIG. 4 is a schematic sectional view showing sections to be exposed by the X-ray CT system 1 shown in FIG. 1.

FIG. 4 is a schematic sectional view showing a section represented by an axial image produced by the reconstruction block 41.

As shown in FIG. 4, assuming that the body axis is a z axis and a section represented by an axial image (axial section) is an xy plane, a section represented by a sagittal image (sagittal section) is a yz plane and a section represented by a coronal image (coronal section) is an xz plane. Thus, the sagittal section and coronal section are sections parallel to the body axis. Tomographic images of the sagittal section and coronal section shall be called the sagittal image and coronal image respectively. An example of a second tomographic image employed in the present invention corresponds to at least one of the sagittal image and coronal image.

As parameters based on which the above images are produced, a range of image production within which images of other sections are produced from axial images, and an amount of data contained in each of division fields falling within the range of image production, for example, a slice thickness are designated. The range of image production and slice thickness will be described later.

Furthermore, the parameter designation block 44 designates a range of movement of the scanner gantry 2 and a magnitude of X-irradiation.

The parameter designation block 44 transmits the designated parameters to each of the reconstruction block 41 and image division block 42. The parameters are designated prior to radiography of a subject.

The image division block 42 divides each of the axial images produced by the reconstruction block 41 into predetermined fields in response to a command sent from the parameter designation block 44. The image division block 42 adds up the pixel data items constituting each of the division fields of each of the axial images in a direction orthogonal to a direction in which the axial images are divided. If necessary, the image division block 42 averages the sum of pixel data items. The image division block 42 transmits the divided images to the image production block 43.

The image production block 43 concatenates a plurality of axial images, each of which is divided into the predetermined fields by the image division block 42, so as to produce images that develop in the z-axis direction corresponding to the body-axis direction. For concatenation, the image production block 43 interpolates the division fields in the z-axis direction if necessary so as to produce the images. Moreover, the image production block 43 averages the sum of pixel data items contained in each of the division fields of each of the axial images. The averages are also added up in the z-axis direction. Consequently, sagittal images or coronal images are produced.

An example of an image processing means included in the present invention corresponds to the image division block 42 and image production block 43.

The image production block 43 transmits the image data of the produced sagittal images or coronal images to each of the display device 33 and storage device 34.

In the central processing unit 31 having the foregoing components, a user designates a plurality of parameters in the parameter designation block 44 using the input device 32. Based on the parameters, the image division block 42 and image production block 43 perform image processing on projection data received from the data acquisition unit 24. Consequently, a plurality of sagittal images or a plurality of coronal images is produced from a plurality of axial images.

According to the X-ray CT system 1 of the present embodiment, when parameters based on which axial images are produced are designated, parameters based on which sagittal images or coronal images are produced are also designated. Consequently, when the axial images are produced, sagittal images or coronal images are produced from the axial images according to the designated parameters by following a series of steps. Moreover, when the sagittal images or coronal images are produced, since a slick thickness can be designated in advance, an unnecessarily large number of images will not be produced. Eventually, the number of images a user has to interpret can be reduced.

Next, the actions to be performed in the X-ray CT system 1 in accordance with the present invention will be described with reference to the drawings.

Figure 5:
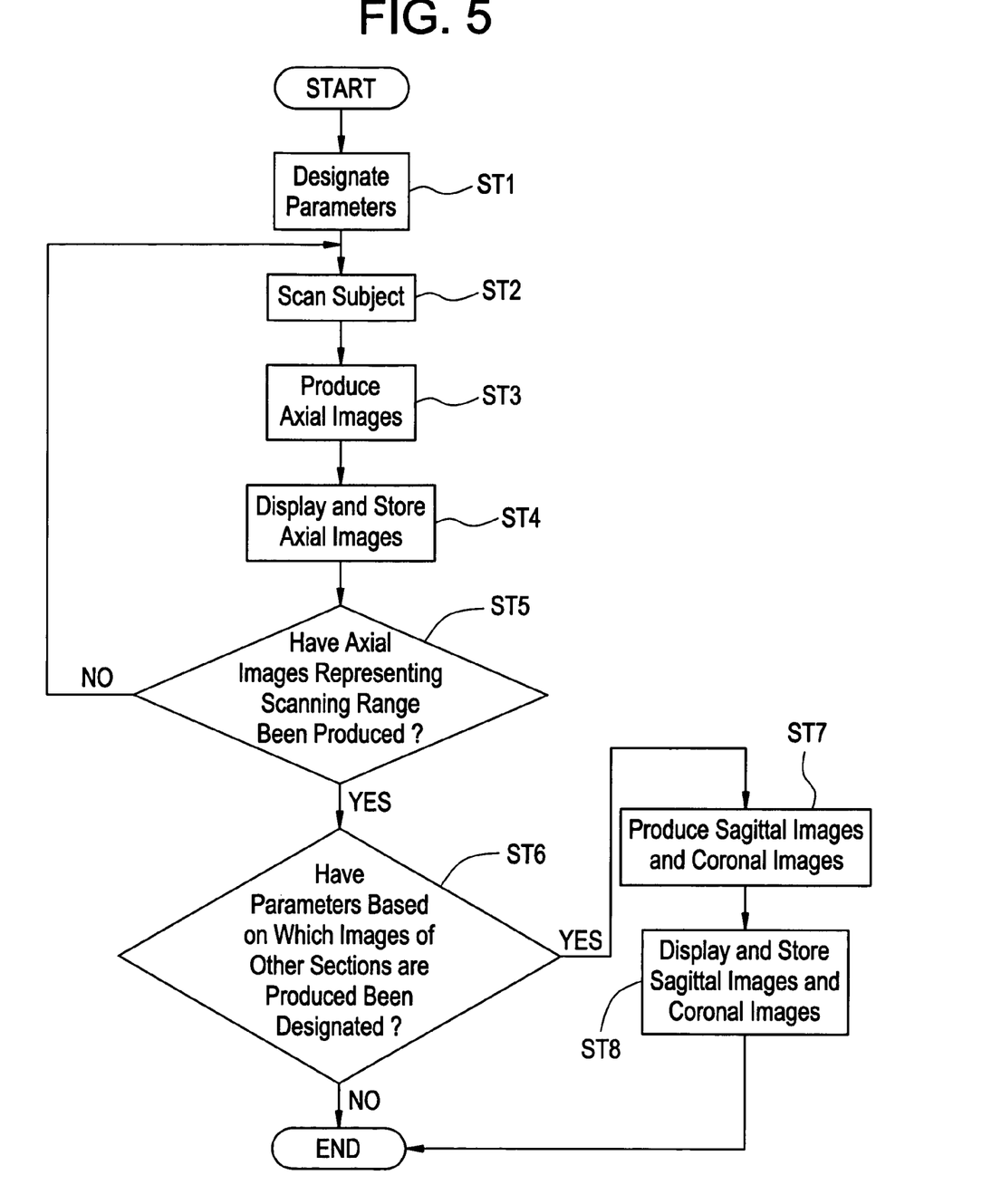
FIG. 5 is a flowchart describing the actions to be performed in the X-ray CT system 1 shown in FIG. 1.

FIG. 5 is a flowchart describing the actions to be performed in the X-ray CT system 1 in accordance with the present invention.

To begin with, a user uses the input device 32 to enter a scanning range, a slice thickness for axial images, a field of view (FOV), a window width (W/W), a window level (W/L), a slice thickness for sagittal or coronal images, and a range of image production. Thus, the conditions for radiography and the conditions for image processing are designated in the parameter designation block 44 included in the central processing unit 31 (ST1).

Figure 6:
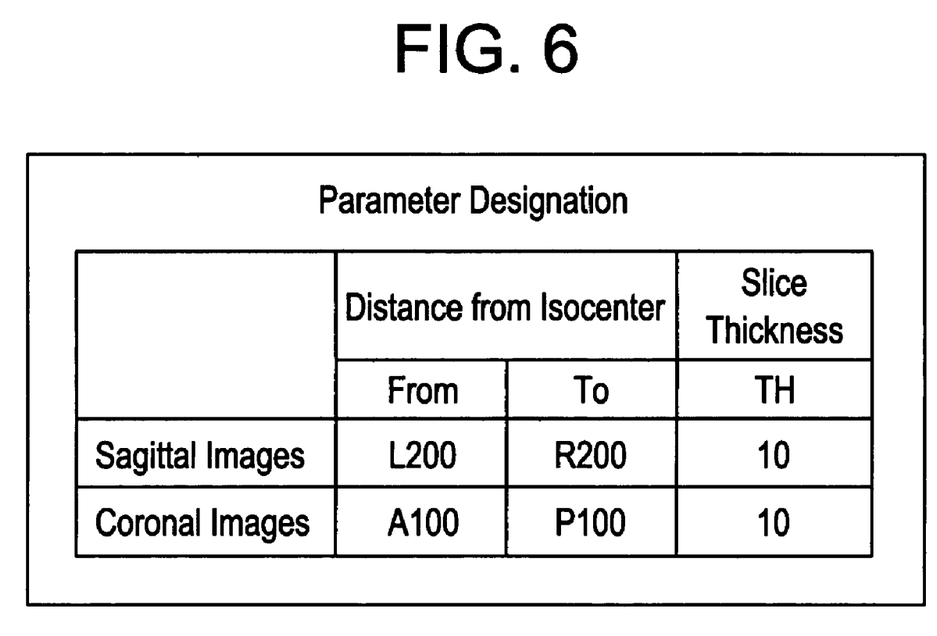
FIG. 6 is a schematic view showing an example of a parameter designation screen image displayed in the X-ray CT system 1 shown in FIG. 1.

FIG. 6 shows an example of a parameter designation screen image via which parameters based on which sagittal images or coronal images are produced are designated.

As shown in FIG. 6, right and left lateral distances (R200 and L200) from an isocenter and a slice thickness (TH 10) are designated as the conditions for producing sagittal images. Anterior and posterior distances (A100 and P100) from the isocenter and a slice thickness (TH 10) are designated as conditions for producing coronal images. The right and left lateral distances from the isocenter or the anterior and posterior distances therefrom define the range of image production.

Moreover, the number of pixels constituting each axial image may be designated on behalf of the slice thickness.

Thereafter, a user asks a subject to lie down on the radiographic table 4. Thereafter, the user uses the input device 32 to issue a command to the central processing unit 31. The central processing unit 31 moves the scanner gantry 2 while rotating the rotary unit 27, and allows the X-ray tube 21 to irradiate X-rays. Thus, the subject is scanned (ST2). The detector array 23 detects X-rays having passed through the subject, and the data acquisition unit 24 acquires a view of projection data. The data acquisition unit 24 transmits the acquired projection data to the central processing unit 31.

Incidentally, after a subject is scanned in a scout mode, the parameters including the scanning range may be designated at step ST1. Thereafter, the subject may be scanned at step ST2.

The central processing unit 31 executes image reconstruction so as to produce axial images (ST3).

The reconstruction block 41 included in the central processing unit 31 uses the projection data to execute image reconstruction and thus produces axial images. Moreover, the reconstruction block 41 transmits the produced axial images to the display device 33. If necessary, the reconstruction block 41 transmits the produced axial images to the storage device 34.

Thereafter, the produced axial images are displayed on the display device 33, and stored in the storage device 34 (ST4).

The user views the axial images displayed on the display device 33 and confirms that the images representing the scanning range have been produced (ST5). If the images of the scanning range have not been produced or if the scanning range must be modified, processing may be resumed from step ST1 or step ST2.

Thereafter, the central processing unit 31 checks if the parameters based on which images of other sections are produced have been designated at step ST1 (ST6). If the parameters have not been designated, radiography by the X-ray CT system is completed.

If the parameters based on which images of other sections are produced have been designated, the central processing unit 31 continues image processing. Sagittal images and coronal images are produced based on axial images (ST7).

A method of producing sagittal images and coronal images will be described below.

To begin with, a step of producing sagittal images will be described.

Figure 7A:
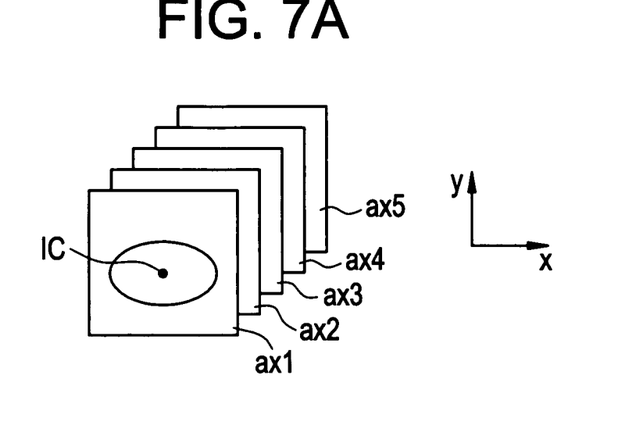
FIGS. 7a, 7b, and 7c illustrate schematic views showing part of an image processing step to be followed in the X-ray CT system 1 shown in FIG. 1.
Figure 7B:
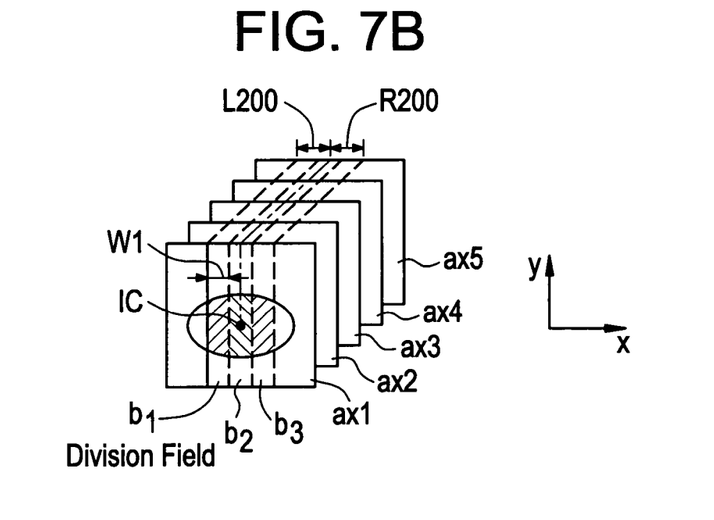
Figure 7C:
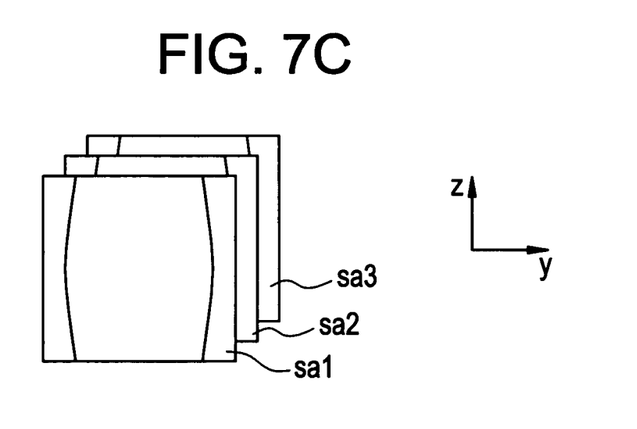

FIGS. 7*a*, 7*b*, and 7*c* illustrate schematic views illustratively showing part of the sagittal image production step.

First, as shown in FIG. 7(*a*), the reconstruction block 41 transmits image data of produced axial images ax1 to ax5 to the image division block 42. The axial images ax1 to ax5 have been produced based on a slice thickness for axial images designated in the parameter designation block 44. Incidentally, the number of axial images to be transmitted to the image division block 42 is not limited to five.

Thereafter, as shown in FIG. 7(*b*), the image division block 42 divides each of the axial images ax1 to ax5 in parallel with the y axis into division fields b1 to b3 within the range defined with the designated right and left lateral distances (R200 and L200) from an isocenter IC according to the parameters designated in order to produce sagittal images. At this time, the width w1 of each of the division fields b1 to b3 corresponds to a slice thickness for sagittal images designated in the parameter designation block 44.

Thereafter, the image division block 42 adds up in the x-axis direction the pixel data items, which are represented by the same y-coordinate, among all the pixel data items contained in the division field b1 of the axial image ax1 developed on the xy plane. Furthermore, the image division block 42 averages the sum of the pixel data items. Thus, pixel data items lined in the y-axis direction are produced. The image division block 42 performs the above processing on each of the division fields b1 to b3 of the axial image ax1. The resultant pixel data items are transmitted to the image production block 43. Herein, what is referred to as pixel data corresponds to a CT number or a luminance value exhibited by each pixel.

Thereafter, as shown in FIG. 7(*c*), the image production block 43 concatenates in the z-axis direction the pixel data items, which are calculated by averaging each of the sums of the pixel data items contained in the division field b1 of each of the axial images ax1 to ax5, so as to produce a sagittal image sa1.

At this time, a distance between the centers of adjoining ones of the axial images ax1 to ax5 may be smaller than the slice thickness for axial images, that is, adjoining ones of the axial images ax1 to ax5 may overlap. In this case, the image production block 43 does not use one of overlapping images when producing the sagittal image sa1.

Moreover, if the distance between the centers of adjoining ones of the axial images ax1 to ax5 is larger than the slice thickness for axial images, that is, if adjoining ones of the axial images ax1 to ax5 do not overlap, the image production block 43 interpolates in the z-axis direction the data items calculated from the respective division fields so as to produce the sagittal image sa1.

The same processing as the foregoing one is performed on the other division fields b2 and b3. Consequently, a plurality of sagittal images sa1 to sa3 developed on the yz plane is produced as shown in FIG. 7(*c*).

The image production unit 43 transmits the produced sagittal images sa1 to sa3 to each of the display device 33 and storage device 34.

Thereafter, a coronal image production step will be described below.

Figure 8A:
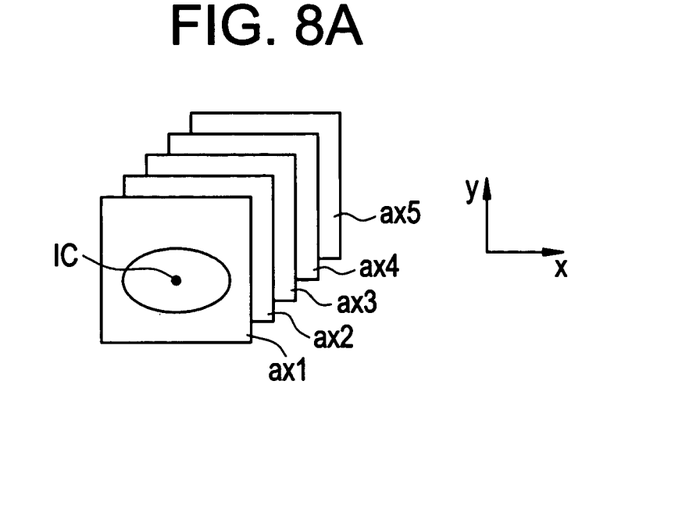
FIGS. 8a, 8b, and 8c illustrate schematic views showing part of an image processing step to be followed in the X-ray CT system 1 shown in FIG. 1.
Figure 8B:
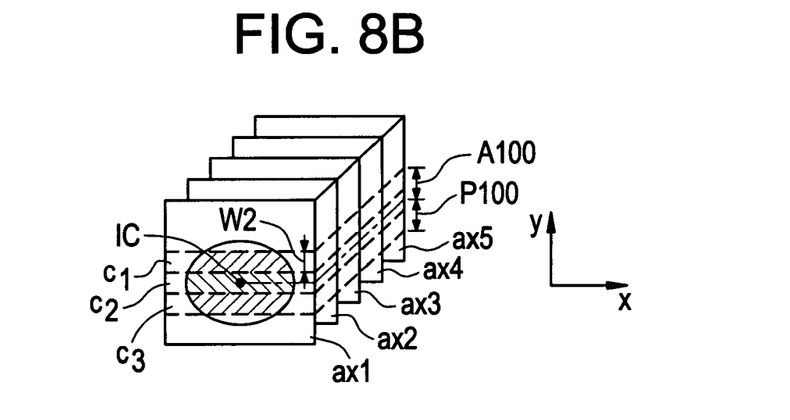
Figure 8C:
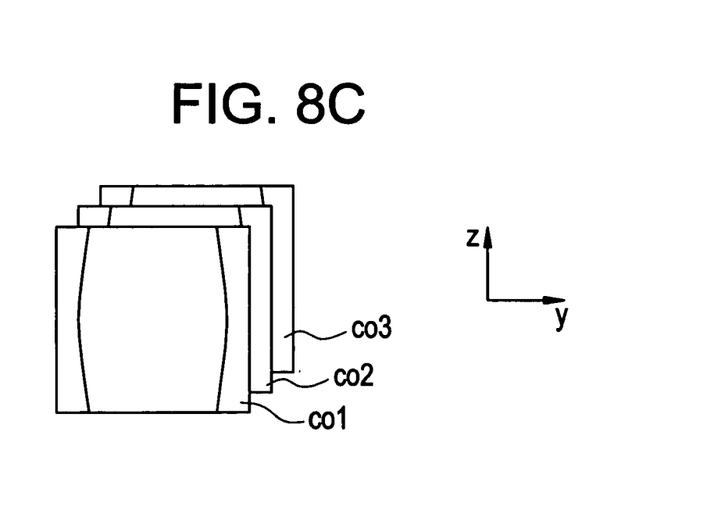

FIGS. 8*a*, 8*b*, and 8*c* illustrate schematic views illustratively showing part of the coronal image production step. The coronal image production step is substantially identical to the foregoing sagittal image production step. Only a difference will be described below.

First as shown in FIG. 8(*a*), the reconstruction block 41 transmits data items of the plurality of axial images ax1 to ax5 to the image division block 42. The axial images ax1 to ax5 are produced based on the slice thickness designated in the parameter designation block 44.

Thereafter, as shown in FIG. 8(*b*), the image division block 42 divides each of the axial images axi to ax5 in parallel with the x axis into division fields ci to c3 within the range defined with the designated anterior and posterior distances (A100 and P 100) from the isocenter IC according to the parameters designated as listed in FIG. 6. At this time, the width w2 of each of the division fields corresponds to the slice thickness designated in the parameter designation block 41. The image division block 42 adds up in the y-axis direction the pixel data items contained in each of the division fields of each of the axial images axi to ax5, and averages the sum. The image division block 42 then transmits the resultant data to the image production block 43.

Thereafter, as shown in FIG. 8(*c*), the image data items calculated by averaging the sums of the pixel data items contained in each of the division fields c1 of the axial images ax1 to ax5 are concatenated in the z-axis direction in order to produce a coronal image co1. When the image data items calculated by averaging the sums of the pixel data items contained in each of the division fields c1 of the axial images ax1 to ax5 are concatenated, data items may be interpolated or deleted if necessary.

The same processing as the foregoing one is performed on the other division fields b2 and b3. Consequently, a plurality of coronal images co1 to co3 is produced.

The image production block 43 transmits the produced coronal images to each of the display device 33 and storage device 34.

As mentioned above, sagittal images and coronal images are produced by following a series of steps according to parameters like the ones listed in FIG. 6 a user designates prior to radiography. Consequently, the user should merely designate the parameters prior to radiography and check axial images. The central processing unit 31 then produces the sagittal images and coronal images.

Thereafter, the sagittal images and coronal images produced by the central processing unit 31 are displayed on the display device 33 and stored in the storage device 34 (ST8).

The user views the sagittal images and coronal images displayed on the display device 33.

According to the image processing method of the present invention, before a subject is scanned, parameters based on which sagittal images or coronal images are produced are designated. Consequently, when axial images are produced, sagittal images and coronal images are produced from the axial images by following a series of steps according to the parameters. Moreover, for the production of the sagittal images or coronal images, a slice thickness can be designated in advance. An unnecessarily large number of images will therefore not be produced. Furthermore, even if the number of exposures is large, the time required from radiography to interpretation can be shortened. Moreover, images can be readily preserved and sorted out.

A radiography system in accordance with the present invention is not limited to the X-ray CT system of the aforesaid embodiment.

For example, although the X-ray CT system in accordance with the present invention produces both sagittal images and coronal images, one of the sagittal images and coronal images may be produced. Moreover, the number of images and the scanning range are taken for instance and may be modified Furthermore, images of any sections other than the sagittal and coronal sections can be produced.

Various modifications can be made without a departure from the gist of the present invention.

Many widely different embodiments of the invention may be configured without departing from the spirit and the scope of the present invention. It should be understood that the present invention is not limited to the specific embodiments described in the specification, except as defined in the appended claims.

The invention claimed is:

1. An X-ray CT system comprising:
a parameter designating device for designating parameters for producing a second tomographic image from a plurality of first tomographic images, said parameters designated prior to a scan for producing said plurality of first tomographic images;
an X-ray source;
an X-ray detector opposed to said X-ray source such that a subject may be positioned between said X-ray detector and said X-ray source, said X-ray detector detecting X-rays irradiated from said X-ray source to the subject, and said X-ray source being rotated about the subject and moved to produce said plurality of first tomographic images and said second tomographic image;
an image producing device for producing said plurality of first tomographic images representing sections that are orthogonal to a body axis extending between a head of the subject and feet of the subject, said plurality of first tomographic images produced at predetermined positions with respect to the subject; and
an image processing device for producing said second tomographic image from said plurality of first tomographic images according to said designated parameters, said second tomographic image representing a predetermined section parallel to the body axis.

2. An X-ray CT system according to claim 1, wherein:
said parameter designating device designates a range of production in one of said plurality of first tomographic images and the subject, the range of production based on the predetermined parallel section at which said second tomographic image is produced, said parameter designating device also designates a slice thickness for said second tomographic image based on the range of production; and
said image processing device comprises:
an image division block that divides each of said plurality of first tomographic images into a plurality of division fields according to the designated slice thickness; and
an image production block that produces said second tomographic image by performing image processing of concatenating said division fields of said plurality of first tomographic images in a body-axis direction.

3. An X-ray CT system according to claim 2, wherein in said image processing device, said image division block adds up pixel data items contained in each of said division fields, and said image production block produces said second tomographic image by concatenating in the body-axis direction said division fields of said plurality of first tomographic images.

4. An X-ray CT system according to claim 3, wherein in said image processing device, said image division block calculates averages of the sums of pixel data items contained in each of said division fields of each of said plurality of first tomographic images, and said image production block produces said second tomographic image by concatenating said division fields of said plurality of first tomographic images, of which pixel data items are added up and averaged, in the body-axis direction.

5. An X-ray CT system according to claim 2, wherein in said image processing device, said image division block adds up pixel data items, which are contained in each of said division fields of each of said plurality of first tomographic images, in a direction orthogonal to a direction in which each of said plurality of first tomographic images is divided.

6. An X-ray CT system according to claim 2, wherein said parameter designating device comprises the range of production, based on the predetermined parallel section at which said second tomographic image is produced, designated therein relative to the isocenter in said subject.

7. An X-ray CT system according to claim 2, wherein said parameter designating device comprises the range of production, based on the predetermined parallel section at which said second tomographic image is produced, designated therein relative to a position at which the subject is located.

8. An X-ray CT system according to claim 1, wherein in said image processing device, said image production block interpolates corresponding division fields in the body-axis direction so as to produce said second tomographic image.

9. An X-ray CT system according to claim 1, wherein said image processing device produces said second tomographic image representing one of a sagittal section and a coronal section.

10. An X-ray CT system according to claim 1 wherein, after producing said plurality of first tomographic images, said image processing device continuously produces a plurality of second tomographic images according to said parameters that were designated prior to producing said plurality of first tomographic images.

11. A method of producing an image with an X-ray CT system including an X-ray source and an X-ray detector opposed to the X-ray source with a subject between them, said method comprising:

designating parameters that define conditions for producing a second tomographic image from a plurality of first tomographic images wherein the parameters are designated prior to a scan for producing the plurality of first tomographic images;

scanning the subject by detecting X-rays irradiated from the X-ray source to the subject with the X-ray detector and rotating the X-ray source about the subject and moving the X-ray source;

producing the plurality of first tomographic images representing sections that are orthogonal to a body axis extending between a head of the subject and feet of the subject, the plurality of first tomographic images produced at predetermined positions with respect to the subject; and producing the second tomographic image from the plurality of first tomographic images according to the designated parameters, the second tomographic image representing a predetermined section parallel to the body axis.

12. A method according to claim 11 wherein designating parameters further comprises:

designating a range of production based on the predetermined parallel section at which the second tomographic image is produced;

designating a slice thickness for the second tomographic image based on the range of production; and dividing each of the plurality of first tomographic images into a plurality of division fields according to the designated slice thickness;

said producing the second tomographic image further comprises producing the second tomographic image by concatenating the plurality of division fields of the plurality of first tomographic images in the body-axis direction.

13. A method according to claim 12 wherein producing the second tomographic image further comprises:

adding pixel data items contained in each of the plurality of division field; and producing the second tomographic image by concatenating the plurality of division fields of the plurality of first tomographic images in the body-axis direction.

14. A method according to claim 13 wherein producing the second tomographic image further comprises:

adding and averaging pixel data items contained in each of the plurality of division fields of each of the plurality of first tomographic images; and producing the second tomographic image by concatenating the plurality of division fields of the plurality of first tomographic images, of which pixel data items are added up and averaged, in the body-axis direction.

15. A method according to claim 13 wherein producing the second tomographic image further comprises adding pixel data items in a direction orthogonal to a direction in which each of the plurality of first tomographic images is divided.

16. A method according to claim 12 wherein producing the second tomographic image further comprises producing the second tomographic image by interpolating corresponding division fields in the body-axis direction.

17. A method according to claim 11 wherein designating parameters further comprises designating a range within which each of the plurality of first tomographic images is divided relative to an isocenter in the subject.

18. A method according to claim 11 wherein designating parameters further comprises designating a range within which each of the plurality of first tomographic images is divided relative to a position at which the subject is located.

19. A method according to claim 11 further comprising scanning the subject and producing a plurality of first tomographic images between designating the parameters and producing the second tomographic image.

20. A method according to claim 11 wherein producing a second tomographic image further comprises, after producing the plurality of first tomographic images, continuously producing a plurality of second tomographic images according to the parameters that were designated prior to producing the plurality of first tomographic images.

* * * * *